US006971700B2

(12) United States Patent
Blanger et al.

(10) Patent No.: US 6,971,700 B2
(45) Date of Patent: Dec. 6, 2005

(54) MOTOR VEHICLE SEAT

(75) Inventors: Vincent Blanger, Saint Etienne (FR); Patrick Faye, Montrond les Bains (FR); Jean-Pierre Chabanne, Champvallon (FR)

(73) Assignee: Grupo Antolin-Ingenieria, S.A., Burgos (ES)

( * ) Notice: Subject to any disclaimer, the term of this patent is extended or adjusted under 35 U.S.C. 154(b) by 0 days.

(21) Appl. No.: 10/882,298

(22) Filed: Jul. 2, 2004

(65) Prior Publication Data

US 2005/0057066 A1 Mar. 17, 2005

(51) Int. Cl.[7] .................................. B60N 2/02
(52) U.S. Cl. .............................. 296/65.16; 296/65.13; 297/341
(58) Field of Search .......................... 296/65.16, 65.17, 296/65.13, 65.01; 297/341, 354.11, 378.1

(56) References Cited

U.S. PATENT DOCUMENTS 6,234,553 B1 * 5/2001 Eschelbach et al. ..... 296/65.14
6,598,926 B1 * 7/2003 Price et al. .............. 296/65.09
6,817,670 B2 * 11/2004 Macey .................... 297/378.1

* cited by examiner

*Primary Examiner*—Stephen Gordon
(74) *Attorney, Agent, or Firm*—Oliff & Berridge, PLC

(57) ABSTRACT

This seat (1) has a mechanism comprising:

a link rod called the transmission link rod (16) rotationally connected, at one of its ends, to the backrest (3), and a link rod called the bearing link rod (17) rotationally connected, at one of its ends, to the vehicle structure, these two link rods (16, 17) being rotationally connected to one another at their second end, the rotation of the backrest (3) towards the seat part (2) causing the bearing link rod to rotate into a fixed position in which the link rod bears against a stop that is fixed with respect to the vehicle structure, then the seat (1) to move into a predetermined position owing to the transmission, via the transmission link rod (16), of the rotational movement of the backrest (3) into a translational movement of the seat (1).

5 Claims, 4 Drawing Sheets

MOTOR VEHICLE SEAT

The present invention relates to a motor vehicle seat.

In some types of vehicle, the seats have a structure that allows them to be stowed in the floor.

To this end, the seats provide that the backrest can be folded down against the seat part and, at the same time, the seat part consisting of a deformable parallelogram is pressed down into the floor.

In such a configuration, the seat takes up less room than when it is in a configuration in which the backrest is substantially vertical with respect to the seat part. This makes it possible to increase the loading volume of the vehicle as needed without having to remove the seats from the vehicle.

This type of seat is really advantageous in the case of "second row" or "third row" seats, i.e. rear passenger seats. When these seats are stowed, the loading volume of the rear part of the vehicle is considerably enlarged without it being necessary to remove them from the vehicle.

Such seats that are stowable by folding down the backrest also have a function allowing them to be moved longitudinally with respect to the floor of the vehicle. This longitudinal movement takes place by sliding in rails present in the floor.

Because the seats can move longitudinally, when they are stowed it results that, within the same row of several seats (typically a row of three seats), each seat of this row is in an individual position with respect to the floor. In other words, each seat is stowed in the longitudinal position in which it was before stowing. Consequently, within the same row of seats, those in the stowed position may not be aligned in the transverse direction of the vehicle.

However, this is entirely detrimental to the geometry of the loading space that is created by stowing the seats since this space then has irregular contours because the stowed seats are not aligned in the transverse direction.

Document FR-A-2 799 702 describes a seat having an articulation arm one end of which slides in a rail having a slot. This articulation arm moves the seat backwards when it is being folded, but the mechanical principle of sliding in a slot gives rise to friction, noise and, ultimately, a significant risk that the arm will jam.

It is therefore an aim of the invention to propose a longitudinally adjustable vehicle seat which, when it is stowed, takes up a predetermined position with respect to the floor of the vehicle and which operates extremely reliably.

The subject of the invention is a seat that can be placed on a motor vehicle structure, that has a seat part on which a backrest is rotationally articulated and that can move in translation with respect to the vehicle structure.

The seat comprises a seat positioning mechanism connected on the one hand to the seat and on the other hand to the structure of the vehicle, allowing the seat to be moved to a predetermined location in the structure of the vehicle when the backrest is rotated towards the seat part, the said mechanism comprising:

- a link rod called the transmission link rod rotationally connected, at one of its ends, to the backrest, and
- a link rod called the bearing link rod rotationally connected, at one of its ends, to the vehicle structure, these two link rods being rotationally connected to one another at their second end, the rotation of the backrest towards the seat part causing the bearing link rod to rotate into a fixed position in which the link rod bears against a stop that is fixed with respect to the vehicle structure, then the seat to move into a predetermined position owing to the transmission, via the transmission link rod, of the rotational movement of the backrest into a translational movement of the seat.

Thus, the seat according to the invention is put back into a predetermined position when it is stowed, by virtue of a mechanism comprising two articulated link rods that function without the risk of becoming wedged or jammed.

Advantageously, the seat comprises two parallel rails, which can be sunk in the structure of the vehicle, in which the seat part slides, one of the rails receiving a fixture having an articulation pin for the bearing link rod and a stop against which the bearing link rod comes to bear when the backrest rotates.

The seat being stowable, the seat part comprises two underframe side plates sliding in each of the rails and two seat part side members connected to each of the side plates by a front upright and two small link rods.

To allow the backrest to incline the latter consists of:

- two lower backrest side plates connected to the two underframe side plates and to the seat part side members, and
- two upper backrest side plates articulated to the two lower backrest side plates.

For a clearer understanding of the invention, it is described with reference to the attached drawings that show, by way of non-limiting example, an embodiment of a seat according to the invention.

Figure 1:
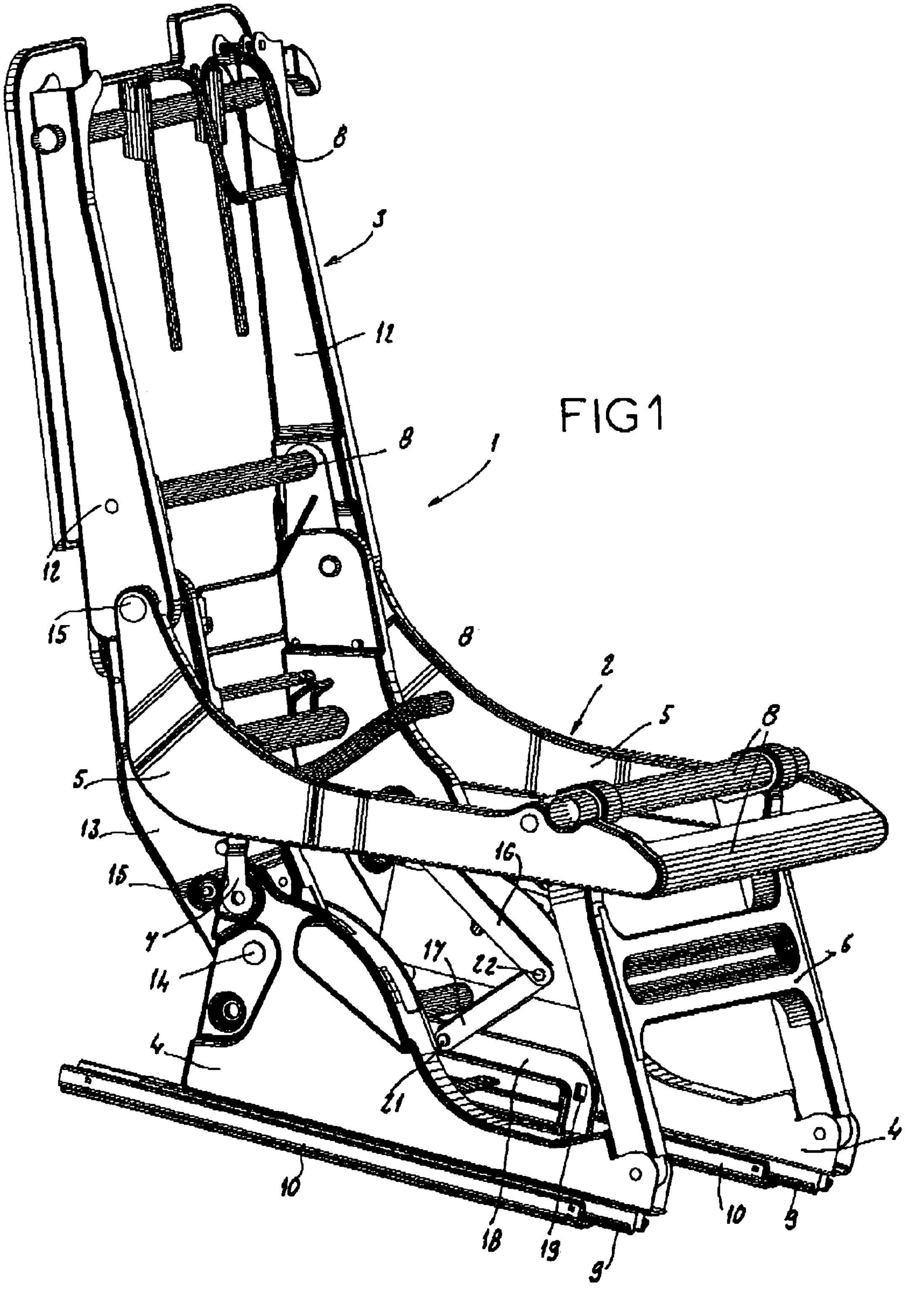
FIG. 1 shows the structure of this seat in perspective.

In the following description the terms longitudinal, transverse, front, rear, upper and lower are understood with reference to the vehicle.

Conventionally, the seat bearing the general reference 1 has a seat part 2 on which a backrest 3 is articulated.

The seat part 2 of the seat comprises two underframe side plates 4 and two seat part side members 5, the underframe side plates 4 and the seat part side members 5 being connected by an upright 6 in the form of a ladder and two small link rods 7.

The assembly formed by the underframe side plates 4, the upright 6, the seat part side members 5 and the small link rods 7 constitutes a deformable parallelogram, these elements being connected by connecting pins that allow a rotational movement.

Note also that a network of crosspieces 8 keeps the seat part together in the transverse direction.

The lower part of each underframe side plate 4 has a runner 9 that slides in a rail 10.

As regards the backrest 3, in the example of a seat shown in FIG. 1, this backrest is adjustable in terms of its inclination. To this end, the backrest 3 consists of two upper backrest side plates 12 and two lower backrest side plates 13, the two upper backrest side plates 12 and the two lower backrest side plates 13 being connected via a conventional toothed sector mechanism for adjusting the inclination of the backrest part formed by the upper side plates 12 with respect to its part formed by the lower side plates 13.

Each of the lower backrest side plates 13 is connected to the seat part of the seat 1, on the one hand by a rotational pin 14 at the underframe side plate 4 and by a rotational pin 15 at the rear end of the seat part side member 5.

The backrest 3 also has a network of crosspieces 8 transversely connecting each of the upper and lower side plates of which it is composed.

The particular feature of the seat according to the invention is that it is provided with a mechanism comprising a link rod called the transmission link rod 16 connected by a rotational pin 20 at one of its ends to the lower backrest side plate 13 and a second link rod called the bearing link rod 17 connected by a rotational pin 21 to the rail 10 by means of a fixture 18 which is substantially in the shape of an inverted U. It can be seen that the fixture 18 has a stop 19 whose function will be explained below. The transmission 16 and bearing 17 link rods are connected together by an articulation pin 22.

The seat 1 thus defined constitutes an autonomous entity that can be placed in the floor of a vehicle during manufacture.

The rails 10 are fastened to the floor of this vehicle and functionally become an integral part thereof. The seat can thus slide longitudinally backwards in its rails 10. A locking system, which will not be described, makes it possible to lock the seat in a position that the occupant wishes it to have with respect to the rails 10.

By virtue of their rotational articulations 20, 21, 22, the transmission 16 and bearing 17 link rods in no way hinder the backward movement of the seat 1 with respect to the rails on which it can slide.

The manner in which the seat 1 is stowed will be explained in conjunction with FIGS. 2 to 4 which show a seat on which the seat part side members 5, the front upright 6 and the upper backrest side plates 12 are not shown for the sake of greater clarity.

Figure 2:
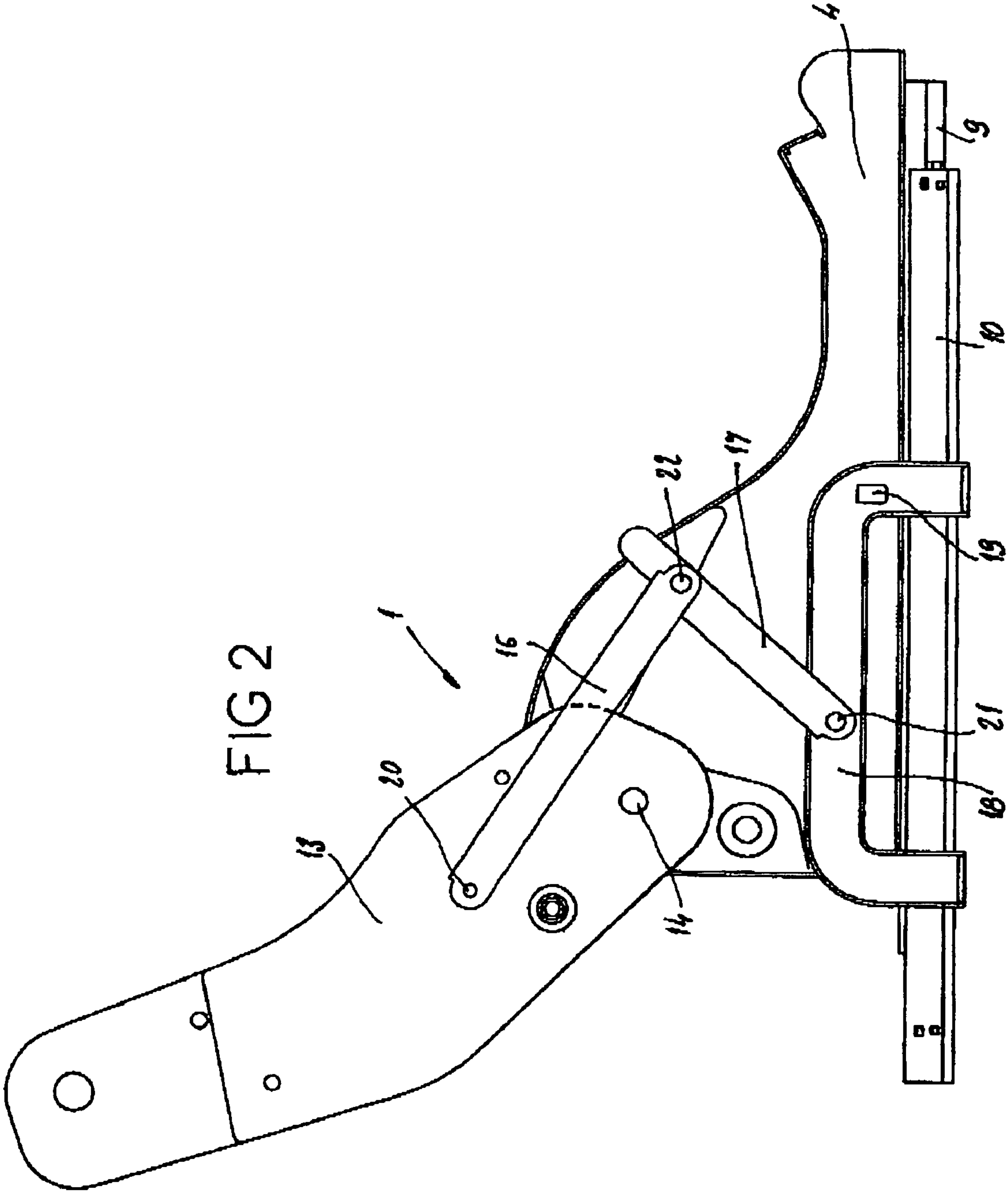
FIGS. 2 to 4 depict, in several successive positions, an embodiment of a mechanism for positioning the seat in a predetermined location.

FIG. 2 shows the seat 1 in a deployed position, i.e. a position in which the backrest (of which only the lower part can be seen in this figure) is substantially in a position close to the vertical and can therefore seat a passenger.

The longitudinal movement of the seat 1 with respect to the rail is translated by a deformation of the mechanism formed by the bearing link rod 17 and the transmission link rod 16.

Conventionally, the seat has members for locking with respect to the rails 10 that will not be described in greater detail. These locking members make it possible to lock the seat in a desired longitudinal position.

When it is wished to stow the seat, the backrest is acted upon to fold it down towards the seat part.

Figure 3:
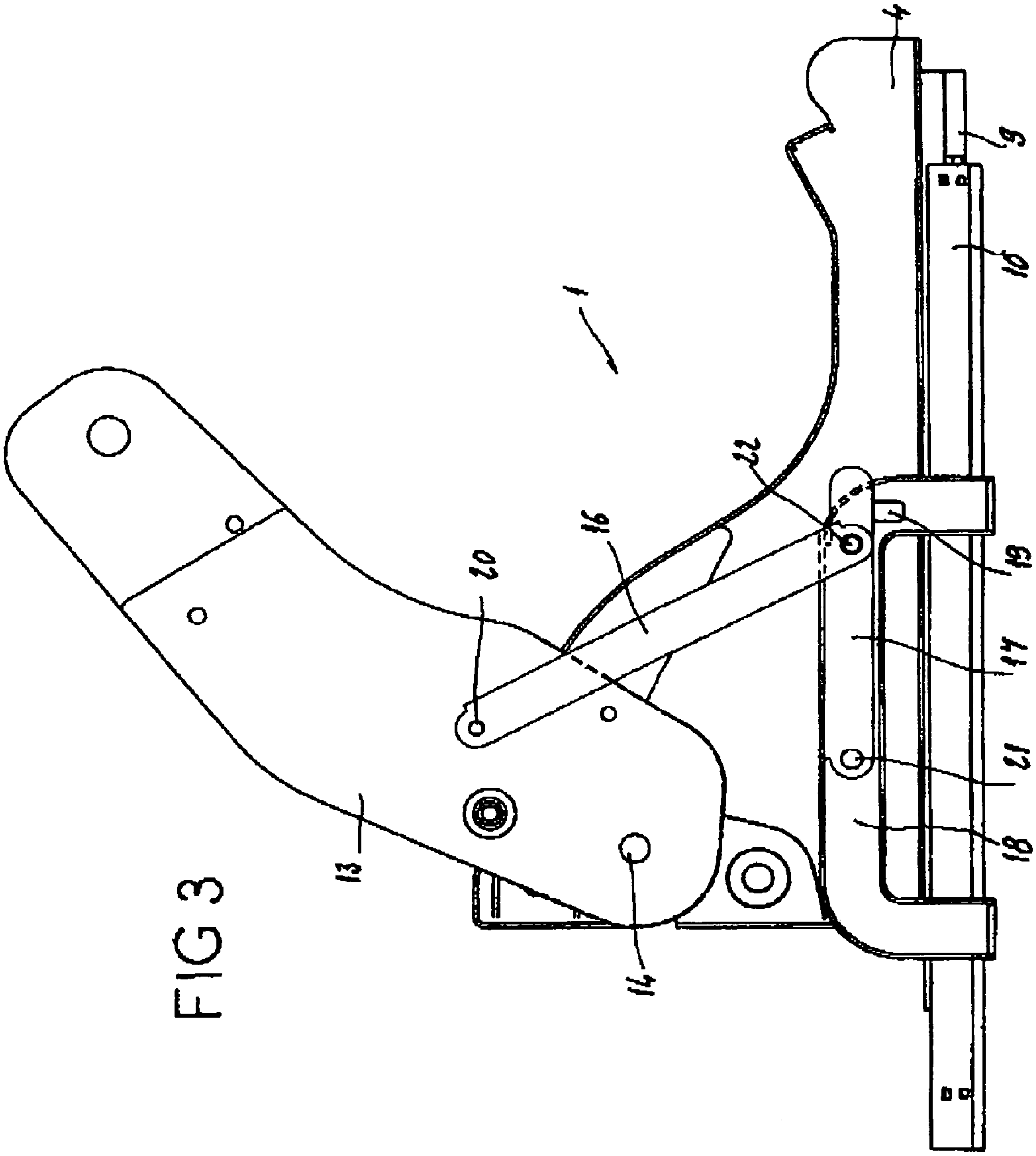
Figure 4:
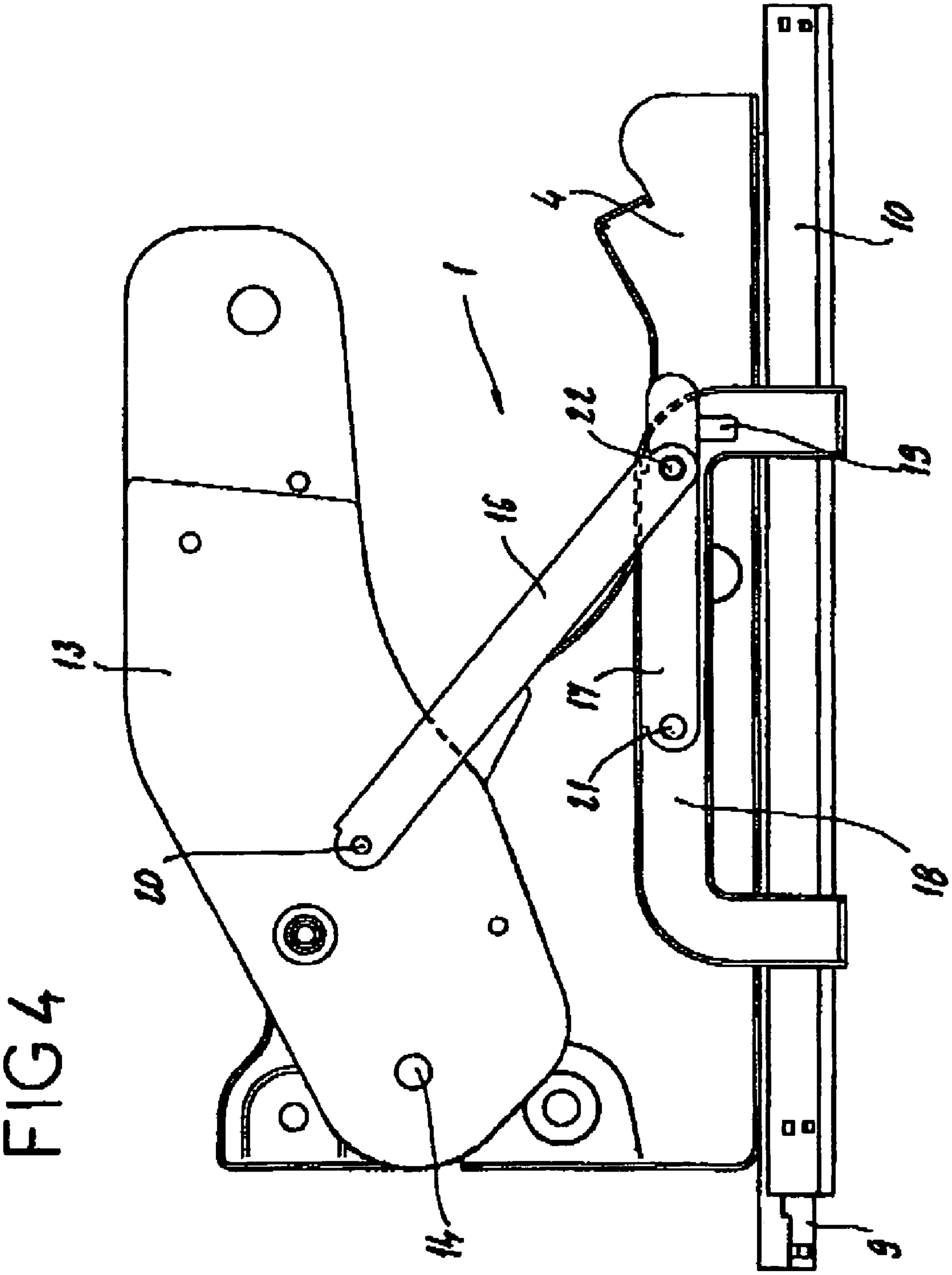

Although not shown in FIGS. 2 to 4, it will thus be understood that the seat part 2, which has a parallelogram structure, deforms so as to be pressed down onto the floor. This a conventional stowable seat structure.

However, the particular feature of the seat that is the subject of the invention is that, by virtue of the mechanism consisting of the transmission link rod 16 and the bearing link rod 17, the seat 1 slides in the rails 10 as far as a predetermined location.

When the backrest 3 rotates, beyond a certain angle, the locking members become disengaged from the rails 10. The seat is then free to move longitudinally with respect to these rails.

Specifically, and thus in the direction from the lower side plate 13 towards the seat part as can be seen in FIG. 3, the bearing link rod 17 comes to bear against the stop 19 on the fixture 18.

It is recalled here that an important point of the seat structure is that the fixture 18 is fixed with respect to the rail 10, i.e. fixed with respect to the floor on which the seat is mounted. Structurally, the fixture 18 is like a part of the structure of the vehicle.

When the seat is thus in the configuration shown in FIG. 3, the bearing link rod 17 is in a fixed position with respect to the fixture 18.

Consequently, the rotational movement that the lower backrest side plate 13 continues to undergo in order to come into contact with the seat part, is then translated into a backward translational movement (in the embodiment shown in the figures).

Specifically, the transmission link rod 16 is thus fixed at its end that is connected to the bearing link rod 17 and the rotational movement of the backrest is translated into a thrust exerted on the seat by this link rod in the longitudinal direction.

FIG. 4 shows the seat with the backrest completely folded down. The mechanism consisting of the transmission link rod 16 and the bearing link rod 17 thus makes it possible to put the seat always back into the same position when it is stowed, whatever the starting position of the seat, i.e. whatever position the seat occupies with respect to the rail 10. This position is determined, on the one hand, by the length of the transmission link rod and of the bearing link rod and, on the other hand, by the longitudinal position of the rotational pin 21 connecting the end of the bearing link rod with respect to the fixture 18, i.e. with respect to the vehicle structure.

The invention thus described has the many advantages stated above since it makes it possible to put a stowable seat back into a predetermined position with respect to the vehicle floor in which it is mounted, while still allowing this seat to move longitudinally.

Naturally, the invention is not limited to the embodiment described above by way of non-limiting example but on the contrary it encompasses all variant embodiments thereof. Thus, although in the example shown in the drawing the predetermined position of the seat when stowed is at the rear of the vehicle, it is of course possible to provide for this predetermined position to be located at the front of the vehicle, and to do so all that is required is to reverse the angle of orientation of the bearing and transmission link rods with respect to one another.

It is also possible to envisage fastening the bearing link rod directly on the vehicle floor.

What is claimed is:

1. Seat that can be placed on a motor vehicle structure, that has a seat part on which a backrest is rotationally articulated and that can move in translation with respect to the vehicle structure, comprising a seat positioning mechanism connected on the one hand to the seat and on the other hand to a floor of the vehicle, allowing the seat to be moved to a predetermined location in the structure of the vehicle when the backrest is rotated towards the seat part, characterized in that the mechanism comprises:

a link rod called the transmission link rod rotationally connected, at one of its ends, to the backrest, and a link rod called the bearing link rod rotationally connected, at one of its ends, to the vehicle structure, these two link rods being rotationally connected to one another at a second end thereof their second end, the rotation of the backrest towards the seat part causing the bearing link rod to rotate into a fixed position in which the bearing link rod bears against a stop that is fixed with respect to the vehicle structure, then the seat to move into a predetermined position owing the transmission, via the transmission link rod, of the rotational movement of the backrest into a translational movement of the seat.

2. Seat according to claim 1, characterized in that it comprises two parallel rails, which can be sunk in the structure of the vehicle, in which the seat part slides, one of the rails receiving a fixture having an articulation pin for the bearing link rod and the stop against which the bearing link rod comes to bear when the backrest rotates.

3. Seat according to claim 1, characterized in that the seat part comprises two underframe side plates sliding in each of two rails and two seat part side members connected to each of the side plates by a front upright and two small link rods, and the backrest is articulated with respect to the underframe side plates and to the side members.

4. Seat according to claim 3, characterized in that the backrest consists of:

two lower backrest side plates connected to the two underframe side plates and to the seat part side members, and two upper backrest side plates articulated to the two lower backrest side plates.

5. Seat according to claim 2, characterized in that the seat part comprises two underframe side plates sliding in each of the rails and two seat part side members connected to each of the side plates by a front upright and two small link rods, and the backrest is articulated with respect to the underframe side plates and to the side members.

* * * * *